US005682446A

United States Patent [19]
Pan et al.

[11] Patent Number: 5,682,446
[45] Date of Patent: Oct. 28, 1997

[54] POLARIZATION MODE DISPERSION-FREE CIRCULATOR

[75] Inventors: J. J. Pan, Milpitas; Kai Zhang, San Jose; Yonglin Huang, Milpitas, all of Calif.

[73] Assignee: E-Tek Dynamics, Inc., San Jose, Calif.

[21] Appl. No.: 726,399

[22] Filed: Oct. 3, 1996

Related U.S. Application Data

[63] Continuation of Ser. No. 542,571, Oct. 13, 1995, abandoned.
[51] Int. Cl.$^6$ ................................................. G02B 6/27
[52] U.S. Cl. ............................. 385/11; 359/496; 385/27; 385/47
[58] Field of Search ........................ 385/11, 15, 16, 385/18, 27, 39, 47; 359/483, 487, 488, 494, 495, 496, 497, 498, 499, 500

[56] References Cited

U.S. PATENT DOCUMENTS

| | | | |
|---|---|---|---|
| 3,720,457 | 3/1973 | Swartz et al. | 359/495 |
| 4,991,938 | 2/1991 | Buhrer et al. | 359/499 |
| 5,204,771 | 4/1993 | Koga | 359/495 X |
| 5,212,586 | 5/1993 | Van Delden | 359/496 X |
| 5,319,483 | 6/1994 | Krasinski et al. | 385/11 X |

OTHER PUBLICATIONS

Shibukawa et al, "Compact Optical Circulator For Near-Infrared Region", Electronics Letters, vol. 14, No. 25, 7, Dec. 1978, pp. 816–817.
Zizzo, Claudio, "Optical circulator for fiber–optic transceivers", Applied Optics, 26:16, Aug. 15, 1987, 3470–3.
Delavaux, J–M. P. et al., "Circulator based amplifier for bi–directional optical transmission in star networks", 53–56.
Fujii, Yohji, "Compact high–isolation polarization–independent optical circulator", Optics Letters, 18:3, Feb. 1, 1993, 250–252.
Shibukawa et al., "Compact optical circulator for optical fiber transmission", Applied Optics, 18:21, Nov. 1, 1979, 3700–3.
Shirasaki et al., "Compact polarization–independent optical circulator", Applied Optics, 20:15, Aug. 1, 1981, 2683–7.
Fujii, "High–Isolation Polarization–Independent Quasi–Optical Circulator", IEEE, 10:9, Sep. 1992, 1226–9, J. of Lightwave Tech.
Emkey, "A Polarization–Independent Optical Circulator for 1.3 μm", IEEE, LT–1:3, Sep. 1983, 466–469, J. of Lightwave Tech.
Matsumoto et al., "Polarization–independent optical circulator: an experiment", Applied Optics, 19:1, Jan. 1, 1980, 108–112.
Koga et al., "High–Isolation Polarization–Insensitive Optical Circulator for Advanced Optical Communication Systems", IEEE, 10:9, Sep. 1992, 1210–1217, J. of Lightwave Tech.
Kuwahara, Hideo, "Optical Circulator", Abstract of U.S. Patent 4,650,289, issued Mar. 17, 1987.
D. Huang et al., "Packaged Double–Pass Travelling–Wave Semi–conductor Laser Amplifiers", Electronics Letters, 27:7, Mar. 28, 1991, 571–572.
Koga et al., "Polarisation–Insensitive High–Isolation Nonreciprocal Device for Optical Circulator Application", Electronics Letters, 27:11, May 23, 1991, 903–905.
Cheng et al., "Novel configuration of an erbium–doped fiber amplifier using an optical circulator", OFC '92, p. 69, 1992–no month).

Primary Examiner—John D. Lee
Attorney, Agent, or Firm—Townsend and Townsend and Crew LLP

[57] ABSTRACT

A high performance optical circulator is formed by a polarization beam splitter and optical port assemblies. The polarization beam splitter is formed by two prisms with an interface between the prisms. The interface transmits linearly polarized light directed at the interface in directions responsive to a polarization orientation of linearly polarized light. The optical port assemblies are arranged with respect to the polarization beam splitter so that light from one port assembly is transmitted by the polarization beam splitter interface to another optical port assembly and light from this optical port assembly is transmitted by the beam splitter interface to still another optical port assembly.

17 Claims, 7 Drawing Sheets

POLARIZATION MODE DISPERSION-FREE CIRCULATOR

This is a continuation of application Ser. No. 08/542,571, filed Oct. 13, 1995, now abandoned, the disclosure of which is incorporated by reference.

BACKGROUND OF THE INVENTION

The present invention relates to an optical device such as an optical circulator or an optical isolator and, more particularly, to a polarization-insensitive, high-isolation optical device which can be configured as an optical circulator with three or four optical ports, or as an optical isolator (two optical ports).

As generally known, in an optical isolator a signal in the forward direction is passed from a first optical port to a second optical port. An optical circulator is a non-reciprocal optical device which allows the passage of light from the first port to the second one (as in an optical isolator), while a reverse signal into the second port is totally transmitted to a third port and so on for the remaining port(s) for a so-called circulating operation. Any two consecutive ports of an optical circulator are, in effect, an optical isolator since signals travel only one way.

Several types of optical circulators have been developed. The structure of a conventional optical circulator was contains three basic components: polarization beam splitters (PBSs), non-reciprocal Faraday rotators, and half-wave plates. In addition, each beam splitter has an associated optical deflection element, for example, a prism. Assembly of the circulator is difficult and isolation of only about 30 dB has been achieved because the circulator employs a conventional PAS cube to divide an unpolarized beam into two linearly polarized beams with mutually perpendicular polarized beams. The extinction ratio for a conventional PAS cube is approximately 30 dB for the reflected S beam. This low extinction ratio leads an isolation performance of the circulator to around 30 dB. Isolation has been improved to around 40 dB by employing additional birefringent crystals, but these additional crystals are comparatively expensive and increases the insertion loss of the circulator. This configuration is very complicated which makes assembly even more difficult. Moreover, the reflection angles of PAS must be maintained very precisely. Otherwise, the extinction ratio is increased and the polarization dependent loss (PDL) is increased.

Another type of circulator is disclosed in U.S. Pat. No. 5,212,586. This circulator collects beams from the second port (the structure between the first port and the second port is a well-known isolator structure by which the beam from the second port can not go back to the first port), and combines them into the third port. Because the optical paths for two divided beams between the second port and the third port are unequal, this circulator is not suitable for high data rate communication because of the high polarization mode dispersion (PMD) contributed by the unequal optical paths. Moreover, the isolation of the circulator is only about 30 dB because it employs only one non-reciprocal Faraday rotator. The extinction ratio of present day Faraday rotators is only about 30 dB which leads to an isolation to around 30 dB in this design.

Another type of circulator has been proposed by M. Koga and T. Matsumoto in an article entitled, "Polarization-insensitive High-isolation Non-reciprocal Device for Optical Circulator Application," *Electronics Letters*, 23 May 1991, Vol. 27, No. 11, pp. 903–905. The structure of this design also has disadvantages. First, the alignment of two waveplates is very difficult because the plates are very small and two plates are adjacent to each other. Nonetheless, the performance of the circulator relies substantially on the alignment of the plates. A small amount of misalignment causes a large degradation of isolation and/or cross-talk. Secondly, the two ports on the same side (ports 1 and 3, and ports 2 and 4) are physically very close, which makes assembly difficult. Thirdly, the optical paths between two consecutive ports are very long; the optical beams must travel through many surfaces, which make a low insertion loss impossible.

All of these circulator designs have one common disadvantage. They employ waveplates. A waveplate is very expensive and its optical axis is very difficult to align. Moreover, a plate is relatively thick and a certain amount of PMD and insertion loss is unavoidable.

It is, therefore, desirable that an optical circulator have optimum performance, i.e., very high isolation, very low polarization dependent loss (PDL), very low polarization mode dispersion (PMD), low insertion loss, very low cross-talk, and high power handling capability. An optical circulator should also be designed for mass production with simple assembly processes.

The present invention avoids many of the problems above and substantially achieves an optical circulator or isolator which has a very high performance and which is easily manufactured. The present invention presents optical devices which are useful for the long distance and high data rate communication.

SUMMARY OF THE INVENTION

The present invention provides for an optical circulator which has a polarization beam splitter formed by first and second prisms with an interface between the prisms. The interface transmits linearly polarized light directed at the interface in directions responsive to a polarization orientation of linearly polarized light. Around the polarization beam splitter, the circulator has at least first, second and third optical port assemblies. Each optical port assembly has an end of an optical fiber, a collimator subassembly which collimates light from the optical fiber end into a beam of collimated light and which focusses a beam of collimated light to the optical fiber end in a reverse direction, and a birefringent crystal dimensioned and arranged with respect to the collimator subassembly to split the collimated light beam from the collimator subassembly into two parallel beams of light linearly polarized perpendicularly to each other, and to combine parallel beams of light linearly polarized perpendicularly to each other in the reverse direction into a beam of collimated light toward the collimator subassembly. Each optical port assembly also has first and second Faraday rotators arranged with respect to the birefringent crystal to rotate the parallel beams from the birefringent crystal by equal and opposite angles so that the rotated beams are linearly polarized parallel to each other and to rotate parallel beams in the reverse direction by equal and opposite angles so that the rotated beams are linearly polarized perpendicularly to each other. The optical port assemblies are arranged with respect to the polarization beam splitter so that light from the first port assembly is transmitted by the polarization beam splitter interface to the second optical port assembly and light from the second optical port assembly is transmitted by the beam splitter interface to the third optical port assembly. The circulator is easily adaptable for a fourth optical port assembly to receive light transmitted by the polarization beam splitter from the third optical port assembly and to send light through the polarization beam splitter to the first optical port assembly.

PREFERRED EMBODIMENTS OF THE INVENTION

Figure 1:
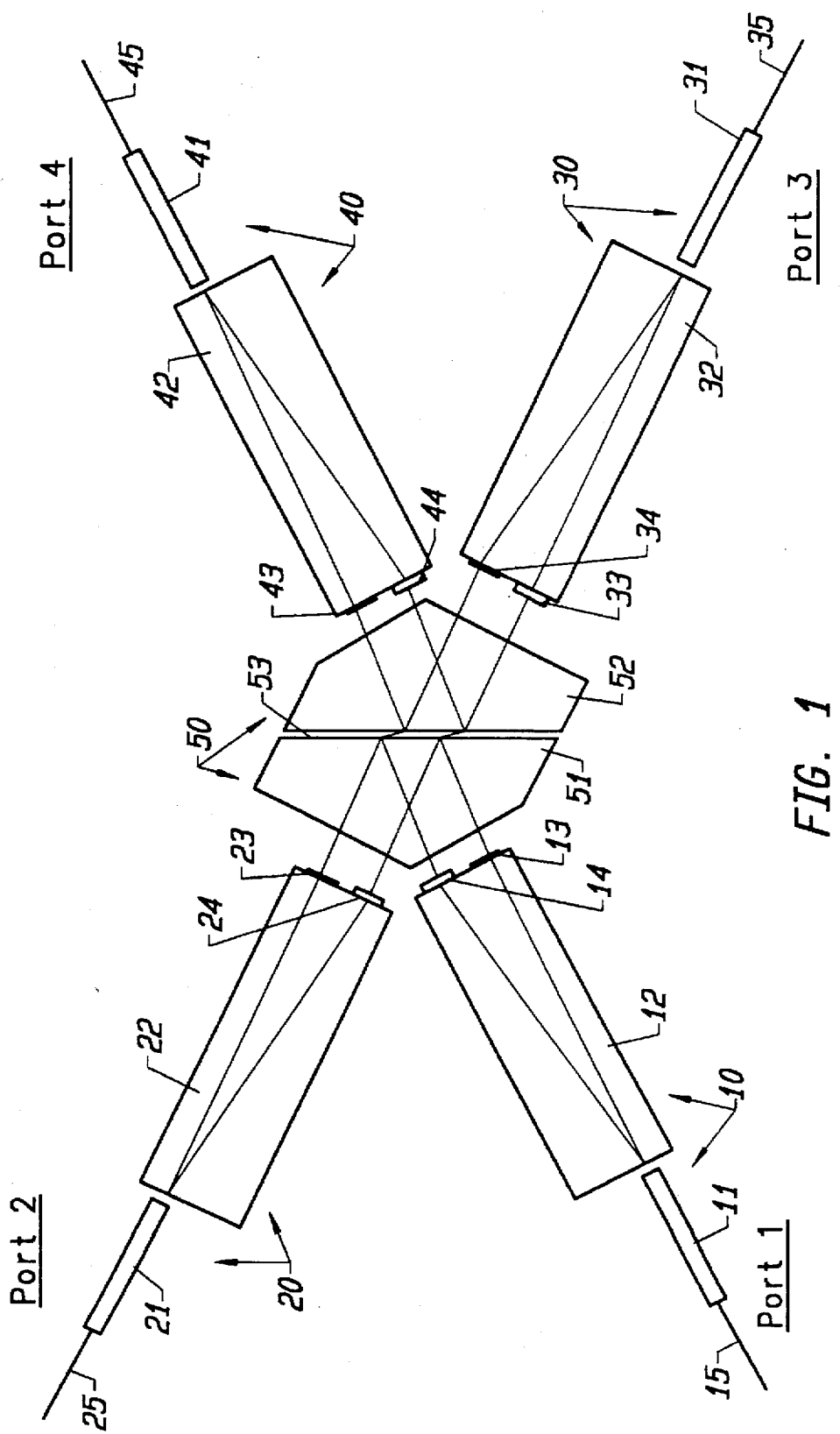
FIG. 1 is a top view diagram showing the basic structure of an optical circulator with four ports according to the present invention.

FIG. 1 shows the elements and the operation of a four-port circulator according to the present invention. The circulator has four optical port assemblies 10, 20, 30 and 40 which form functional ports 1, 2, 3 and 4, respectively. The port assemblies 10, 20, 30 and 40 are arranged around a novel polarization beam splitter (PAS) 50 formed by two birefringent prisms 51 and 52. Light passes to and from the port assemblies through the side faces of the prisms 51 and 52. As explained below, light from port assembly 10 (port 1) passes to port assembly 20 (port 2), light from port assembly 20 (port 2) passes to port assembly 30 (port 3), and light from port assembly 30 (port 3) passes to port assembly 40 (port 4).

Figure 2:
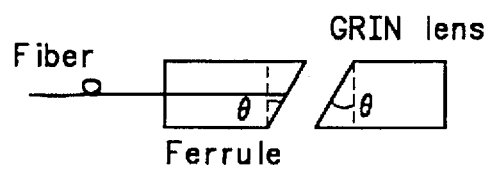
FIG. 2 is a cross-sectional diagram of one of the collimator subassemblies of the port assembly of FIG. 1.

Each port assembly is nearly identical to the other. Each port assembly 10, 20, 30 and 40 has a glass fiber pig-tailed optical collimator subassembly 11, 21, 31 and 41 respectively. Each subassembly holds an end of an optical fiber in a ferrule before a collimating and focusing lens, such as a GRIN (GRaded INdex) lens. As shown in FIG. 2, the end of the fiber is polished at a slight angle θ and coated with anti-reflection material. The end of the GRIN lens facing the end of the optical fiber is also reciprocally polished at the angle θ and coated with anti-reflection material. More description of the design and fabrication process of such collimator subassemblies are disclosed in U.S. Pat. No. 5,208,876, which issued May 4, 1993 to J. J. Pan and assigned to the present assignee. In the forward direction, each collimator subassembly focusses light from its respective optical fiber into a beam of collimated light. In the reverse direction, the collimator subassembly refocuses collimated light entering the subassembly into the end of its respective optical fiber. The optical performance of these subassemblies is quite high. The return loss of these collimator subassemblies is greater than 60 dB and the coupling loss between two collimator subassemblies is very low, 0.3 dB being typical.

Each collimator subassembly 11, 21, 31 and 41 is respectively arranged with respect to a corresponding birefringent beam splitter (BBS), formed by a birefringent rod 12, 22, 32 and 42. Each BBS divides a light beam from its respective collimator subassembly (light in the forward direction) into two linearly polarized beams with mutually perpendicular polarization states and combines two mutually perpendicular polarized beams in the reverse direction. With rutile, calcite, $LiNbO_3$, $YVO_4$ or other birefringent crystals, instead of a conventional cubic PAS of glass, the extinction ratio between the two divided beams is very high, usually more than 60 dB.

Each optical port assembly 10, 20, 30 and 40 also has a pair of non-reciprocal Faraday rotators 13 and 14, 23 and 24, 33 and 34, and 43 and 44, respectively. Each rotator rotates linearly polarized light by 45°, but in the opposite direction with respect to the other rotator in the port assembly. In other words, one rotator rotates linearly polarized light clockwise 45°, while the other rotator rotates linearly polarized light counterclockwise 45°. The materials for the two Faraday rotators may be the same or different. When the Faraday rotation coefficients of the two rotators have opposite signs, only one magnet ring is employed for the two Faraday rotators. If the signs of the Faraday rotation coefficients of the two rotators are the same (whether or not the materials are the same), two magnet rings with different directions of magnetic fields are employed for the Faraday rotators.

Arranged between the port assemblies 10, 20, 30 and 40 is a propagation beam circulating conductor, also called a polarization sensitive optical circulator, in the form of a polarization beam splitter (PAS). A polarization sensitive optical circulator is an optical unit which can circulate optical beams according to their polarizations. A very simple example of a polarization sensitive circulator is the PAS. In a conventional PAS cube, the P-polarized beam propagates through the PAS without changing its propagation direction, while the S-polarized beam is reflected 90° by the PAS. However, the conventional PAS has shortcomings, such as a very low extinction ratio (about 30 dB for the S-beam) and low power handling capability.

While a conventional PAS cube could be used, the full advantages of the present invention are realized with a novel PAS 50 which has been designed for the function of a propagation beam circulating conductor. The extinction ratio of the PAS 50 is very high (more than 60 dB) by employing a birefringent crystal to divide beams into linearly polarized beams. Its power handling capability is also very high because no cement materials are used in the optical paths. The PAS 50, described in detail below, is formed by two birefringent prisms 51 and 52, each having a side surface next to a side surface of the other prism to form an air gap interface 53. The gap interface 53 operates in the same manner as the reflecting and transmitting interface of a conventional PAS. Light linearly polarized in the plane of incidence (P-beam) is transmitted across the gap interface 53 and light linearly polarized perpendicular to the plane of incidence (S-beam) is reflected by the interface 53.

The general operation of the circulator in FIG. 1 is as follows. Light from the optical fiber 15 of port 1 is collimated by the collimator subassembly 11 and passed to the birefringent rod 12. The rod 12 splits the collimated light into two parallel beams, which are linearly polarized perpendicular to each other. Each beam reaches one of the Faraday rotators 13 and 14 and is rotated 45° so that each beam is polarized perpendicular to the plane of incidence (perpendicular to the plane of the drawing). Thus the beams are reflected at the gap interface 53 toward the port assembly 20. Each of the beams, still linearly polarized perpendicular to the plane of incidence, from the gap interface 53 is received and rotated 45° by one of the Faraday rotators 23 and 24 of port 2. The two parallel beams, now linearly polarized perpendicular to each other, enter the birefringent rod 22 and are combined into one beam of collimated light. The collimated light enters the collimator subassembly 21, which focuses the light upon the end of the optical fiber 25 of the port 2. In this manner a light signal from port 1 passes to port 2.

For a light signal originating from port 2, the light from the optical fiber 25 of port 2 is collimated by the collimator subassembly 21 and passed to the birefringent rod 22. The rod 22 splits the collimated light into two parallel beams, which are linearly polarized perpendicular to each other. Each beam reaches one of the Faraday rotators 23 and 24 and is rotated 45° so that each beam is polarized in the plane of incidence (the plane of the drawing). Thus the beams are transmitted through the gap interface 53 toward the port assembly 30. Each of the beams, still linearly polarized in the plane of incidence, is received and rotated 45° by one of the Faraday rotators 33 and 34 of port 3. The two parallel beams, now linearly polarized perpendicular to each other, enter the birefringent rod 32 and are combined into one beam of collimated light. The collimated light enters the collimator subassembly 31, which focuses the light upon the end of the optical fiber 35 of port 3. In this manner a light signal from port 2 passes to port 3.

In a similar manner, light from the optical fiber 35 of port 3 is reflected by the interface 53 into the optical fiber 45 of port 4, and light from the optical fiber 45 of port 4 is transmitted across the interface 53 into the optical fiber 15 of port 1. The described circulator operates as a complete four-port circulator by which light from port 1 is passed to port 2, light from port 2 is passed to port 3, light from port 3 is passed to port 4, and light from port 4 is passed back to port 1.

Figure 3:
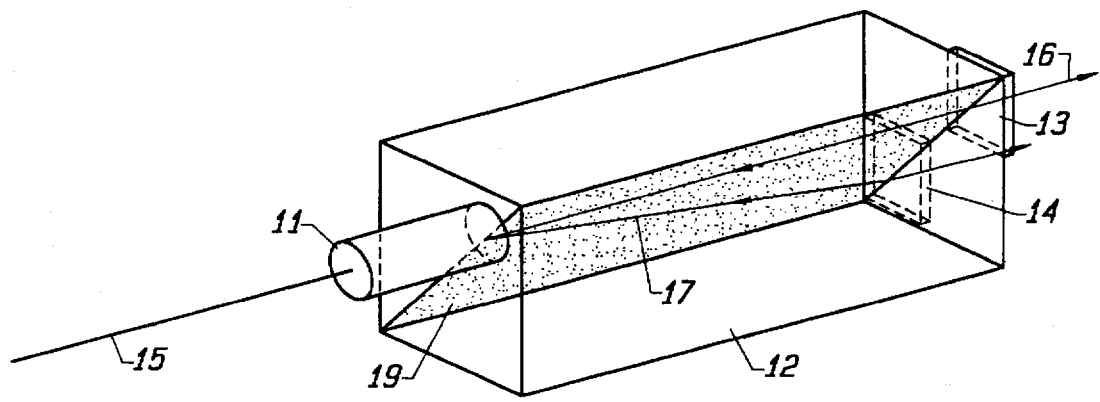
FIG. 3 is a more detailed diagram of one of the optical port assemblies of the optical circulator of FIG. 1.

The details of each port assembly 10, 20, 30 and 40 are shown in FIG. 3, which illustrates the port assembly 10 as an example. The birefringent crystal rod 12 is a rectangle-shaped rod having a square cross-section to the longitudinal axis of the rod. The crystal rod 12 has a principal plane 19, one of the diagonal planes of the rod, in which the optic axis of the crystal lies and in which the divided e-(extraordinary) and o-(ordinary) beams travel through the crystal, as illustrated in FIG. 3. The principal plane 19 is angled 45° from the horizontal plane which is the plane of drawing of FIG. 1.

The collimator subassembly 11 is aligned at one end face of the birefringent crystal rod 12 along the principal plane 19 near the edge of the rod 12. The longitudinal axis of the collimator subassembly 11 and the resulting input beam from the subassembly 11 are perpendicular to the cross-section of the rod. In a cross-sectional view, the subassembly 11 is displaced some distance from the center axis of the rod 12. The position between the collimator subassembly 11 and the crystal rod 12 is designed so that all beams, including the input beam from the collimator subassembly 11 and the divided o-beam 16 and e-beam 17 in the rod 12, enter and leave through the end faces of the rod 12.

The o-beam 16 is unrefracted within the crystal rod 12 and maintains its propagation direction, while the e-beam 17 is refracted by an angle, δ. The polarization of the o-beam 16 is perpendicular to the principal plane 19, while the polarization of the e-beam 17 is parallel to the principal plane 19. After the two beams 16 and 17 pass through the end face of crystal rod 12, the two beams 16 and 17 are parallel to each other and the polarizations of the two beams are perpendicular each other. From a cross-sectional view perpendicular to the propagation direction, the o-beam 16 and the e-beam 17 leave the rod 12 at different heights from the horizontal plane. The planes of polarization of the two beams 16 and 17 are rotated by 45° in opposite directions (viewed in the beam propagation direction) by the two Faraday rotators 13 and 14 respectively. After passing through the Faraday rotators 13 and 14, the two beams 16 and 17 have the same polarization but travel at different heights. The beams 16 and 17 travel through the prism 51 of the PBS 50 are reflected by the prism face at the gap interface 53. The beams 16 and 17 are S-beams in the PBS 50.

Each port assembly 10, 20, 30 and 40 has the basic structure described above. However, the positions of the collimator subassembly, the birefringent crystal rod, and the Faraday rotators are slightly different for the four assemblies. Generally, there are four possible positions for the collimator subassembly 11 with respect to the crystal rod 12 for port 1. After the position of the collimator subassembly 11 with respect to the rod 12 and the material for the birefringent crystal rod are set, the relationships of the elements of the remaining ports 2-4, such as the respective positions between collimator subassemblies 21-41 and the birefringent crystal rods 22-42, are determined. For example, the optical circulator of FIG. 1 have ports 1 and 2 adjacent to each other. If adjustments are made to the birefringent crystal rod 12, the collimator subassembly 11 and the Faraday rotators 13 and 14 so that the light beams emanating from first optical port assembly 10 are polarized in the plane of incidence against the gap interface 53, the second optical port assembly 20 should be located opposite the first optical port assembly 10. Port 2 should be in the position of port 4, and so forth.

Figure 4:
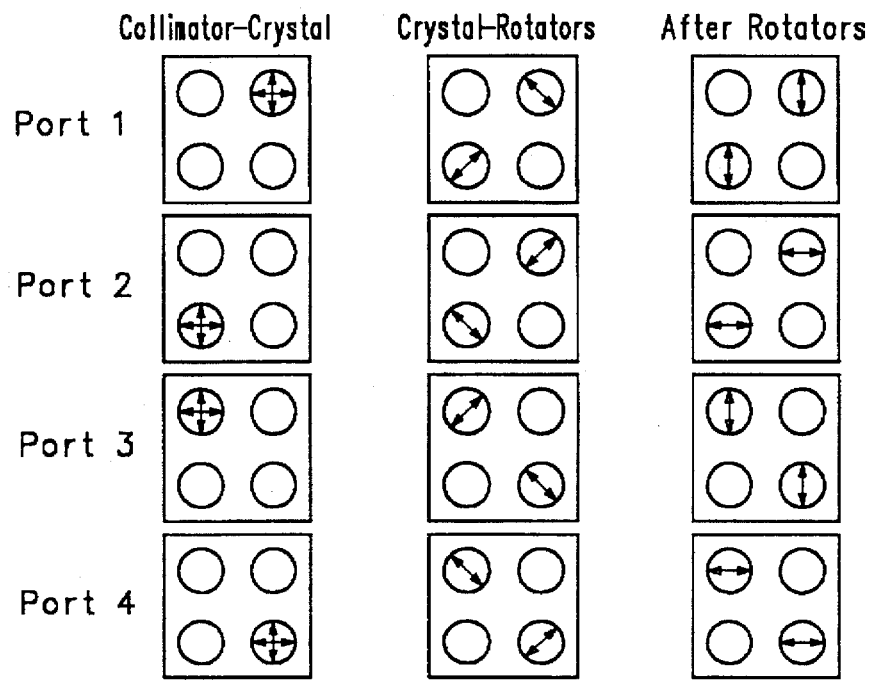
FIG. 4 is a tabular diagram showing the polarization and position of beam(s) at different locations from the collimator subassembly through the Faraday rotators for each of the optical port assemblies of the circulator of FIG. 1.

With the port assembly 10 as described above with respect to FIG. 3, the resulting of polarization and position of the beam(s) of each assembly 10, 20, 30 and 40 are displayed in FIG. 4 in tabular form. Each row corresponds to one of the ports 1-4 and each column represents the state of the light, its cross-sectional position(s) and polarization(s), at a particular location in a port assembly 10, 20, 30 and 40. The column on the left represents the light between a collimator subassembly 11, 21, 31 and 41 and the corresponding birefringent crystal rod 12, 22, 32 and 42. As indicated, the light is a single beam of unpolarized light at different cross-sectional positions for each of the ports 1-4. The middle column represents the state of the light between the crystal rods 12, 22, 32 and 42 and the corresponding Faraday rotators (13 and 14, 23 and 24, 33 and 34, and 43 and 44).

For each of the port assemblies, the light at this position is divided into two beams of mutually perpendicular polarization. The two beams are displaced from each other in the horizontal and vertical directions, as described previously with respect to the port assembly 10. The right column represents the state of the light between the Faraday rotators (13 and 14, 23 and 24, 33 and 34, and 43 and 44), and the PBS 50. The two beams at this location are also displaced horizontally and vertically, but the beams are polarized parallel to each other, either perpendicular to, or parallel with, the plane of incidence.

Finally, it should be noted that direction of the light is not specified. FIG. 4 illustrates the state of the light leaving each port assembly (forward direction) or entering each port assembly (reverse direction).

Figure 5:
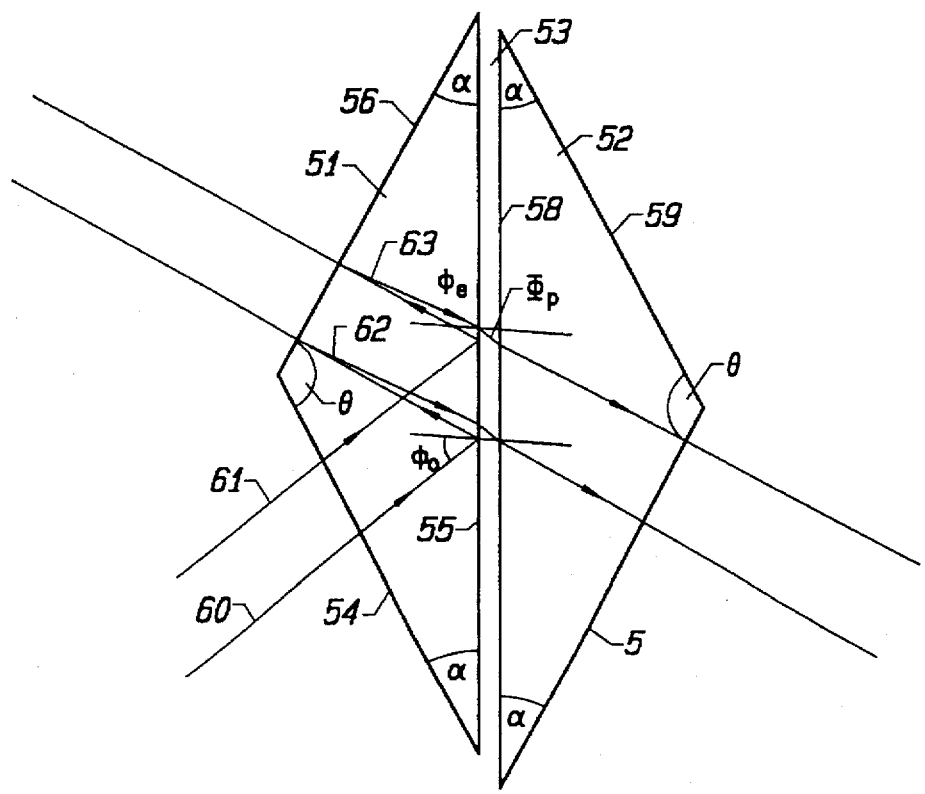
FIG. 5 is a top view diagram of the PAS of the circulator of FIG. 1.

FIG. 5 details the birefringent prisms 51 and 52 of the novel PBS 50. However, the prisms in FIG. 5 are illustrated with the ends of the prisms 51 and 52, which have been trimmed in FIG. 1 for easier packaging of the optical circulator.

The PBS 50 has two birefringent crystal prisms 51 and 52 placed so that corresponding interface side faces 55 and 58 are separated by the slight air gap interface the cross-sectional top view of FIG. 5, the prisms 51 and 52 are shown as two isosceles triangles, each having an apex angle $\Theta$ formed by the side faces 54 and 56, and 57 and 59 respectively. Usually, the prisms are formed from the same material, though it is possible for the prisms to be different. The direction of optical axis and the orientation of the side faces of the first prism 51 are arranged so that the orthogonally linear polarizations of an unpolarized light beam entering the first face 54 of the first prism 51 is broken into two beams (with orthogonally linear polarizations) by the birefringent crystal prism 51. One of the beams is refracted through the second face 55 of the first prism 51 to the corresponding second face 58 of the second prism 52. The other beam is totally and internally reflected at the second face 55. This function is similar to that of a conventional PBS cube. In the present invention the birefringent nature of the crystal 51, with two indices of refraction, is used to help separate the light components according to their polarization.

A third side face 56 of the first prism 51 is oriented so the totally internally reflected beam is refracted through the third face 56 without changing the wavefront and the spot size of the beam. The beam refracted through the second face 55 of the first prism 51 experiences a wavefront change and a spot size change after passing through the face 55. These changes distort the beam and can cause a large polarization dependent loss (PDL). With the second prism 52, these problems are avoided because the wavefront of the beam and its spot size are corrected to the original position and shape by the reciprocal symmetry of the second prism 52 with respect to the first prism 51. Stated differently, two unpolarized parallel beams separated by a given distance and entering one face 54 of the first prism 51 create two polarized beams which leave each face 56 and 57 parallel and separated by the same distance.

The particular PBS of FIG. 5 is formed from lithium niobate, LiNbO$_3$. Other birefringent crystals, such as rutile, calcite, TeO$_2$, or YVO$_4$, can be used for the prisms 51 and 52. LiNbO$_3$ is used as an example. The refractive index of LiNbO$_3$ for the ordinary beam (o-beam) is larger than that for the extraordinary beam (e-beam), i.e., $n_o > n_e$. Although different optical axis orientations can also be used, the case where the optical axis of the crystal is perpendicular to the base plane (z-cut) is described in FIG. 5. The side angle $\alpha$ between the surfaces 54 and 55 of the prism 51 is determined so that the o-beam (which polarization lies within the principal plane) entering the face 54 is totally internally reflected by the surface 55 and transmitted through the surface 56 without distortion. The e-beam (which polarization is perpendicular to the principal plane) entering the surface 54 will be refracted by the surface 55. Mathematically, the following conditions are satisfied at the same time:

$n_e \sin(\phi_e) = \sin(\Phi_e) < 1$, $n_o \sin(\phi_o) > 1$.

These conditions are for negative uniaxial birefringent crystals, where $n_o > n_e$. If the crystals used for the PBS are positive uniaxial birefringent crystals, where $n_o < n_e$, then the conditions are:

$n_o \sin(\phi_o) = \sin(\Phi_o) < 1$, $n_e \sin(\phi_e) > 1$.

Lithium niobate prisms having $\Theta = 125°$ and $\alpha = 27.5°$ have been found to work effectively for the PBS 50 in FIG. 5. Rays 60 and 61 represent the beams from the Faraday rotators 13 and 14 respectively of the optical port assembly 10. As stated previously, the beams from these rotators 13 and 14 are polarized perpendicular to the plane of the drawing. These beams are o-beams in the prism 51 which are reflected by the angle $\phi_o$ by the side face 55 toward the side face 56 and the second optical port assembly 20. Rays 62 and 63 represent beams from the Faraday rotators 23 and 24 of the second optical port assembly 20. These beams as illustrated in FIG. 4, are polarized in the plane of the drawing and are e-beams in the prism 51. The beams are refracted at the side face 55 at the angle $\Phi_e$ in the air gap interface 53 and into the second prism 52 for reception by the third port assembly 30. For illustrative purposes the rays 60 and 61 reflected toward the second port assembly 20 and the rays 62 and 63 from the second port assembly 20 are shown as being separated in the prism 51. Of course, since the optic axis of the birefringent crystal prism 51 is perpendicular to the drawing, the beams represented by these beams do not separate in the prism 51.

A further description of the advantages, construction and operation of the PBS like that shown in FIG. 5 is made in U.S. application Ser. No. 08/542,871, entitled "AN IMPROVED POLARIZATION BEAM SPLITTER", and filed on Oct. 13, 1995 by the present inventors.

When acting as an output port, an optical port assembly combines the two beams from the PBS 50 into port assembly's collimator subassembly. When the port assembly changes its role to an input port, the polarization of the light after passing through the two Faraday rotators is orthogonal to the polarization of beams arriving at this port. Thus the polarization sensitive circulator can direct the beams to another port, and so on, for the remaining ports. Of course, the particular design of the overall circulator device affects its performance. The positioning of the collimator subassemblies with respect to the corresponding birefringent crystal rods 12, 22, 32 and 42 considers the materials used for the birefringent crystal rods, the materials for the PBS prisms 51 and 52 in FIG. 1, and the PMD compensation between two consecutive ports. An example of a circulator having optical port assemblies with different positions for the collimator subassemblies is shown in the perspective views of FIGS. 6A–6D.

Figure 6A:
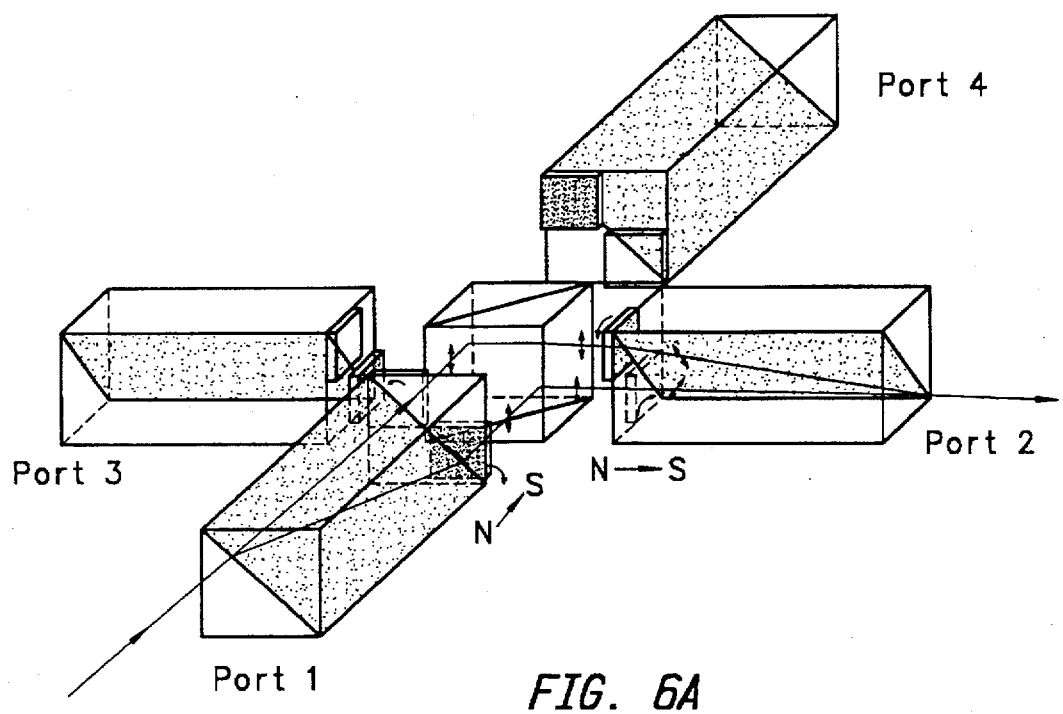
FIG. 6A is another four-port circulator arrangement according to the present invention and illustrates light transmission from the first port to the second port.
Figure 6B:
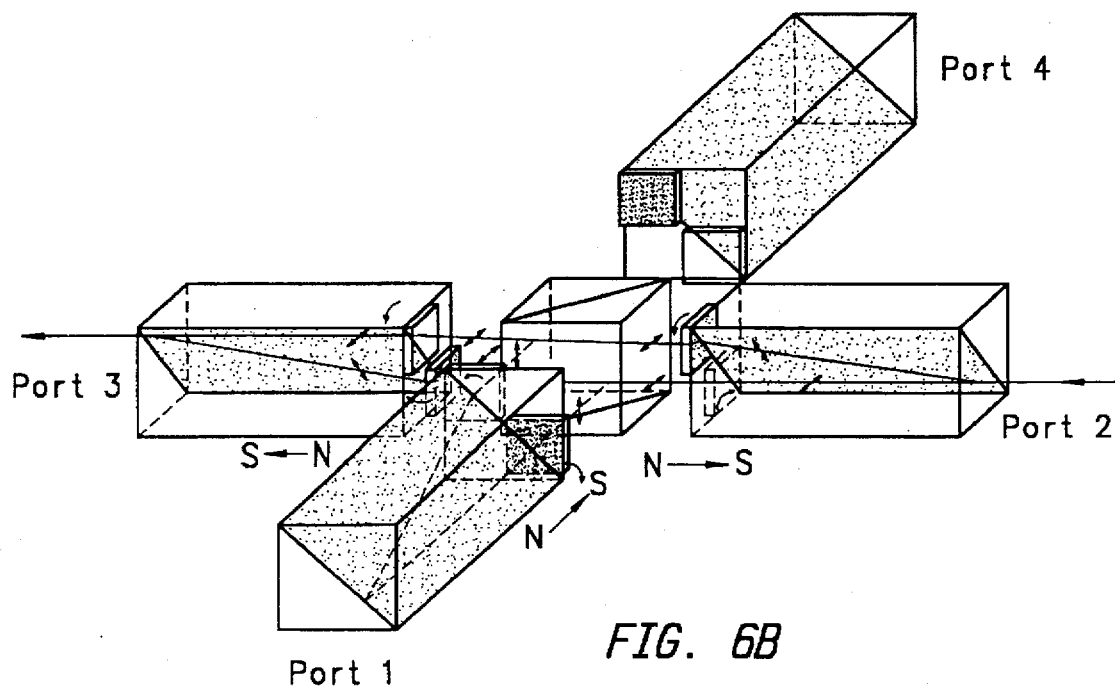
FIG. 6B illustrates light transmission from the second port to the third port of the FIG. 6A circulator.
Figure 6C:
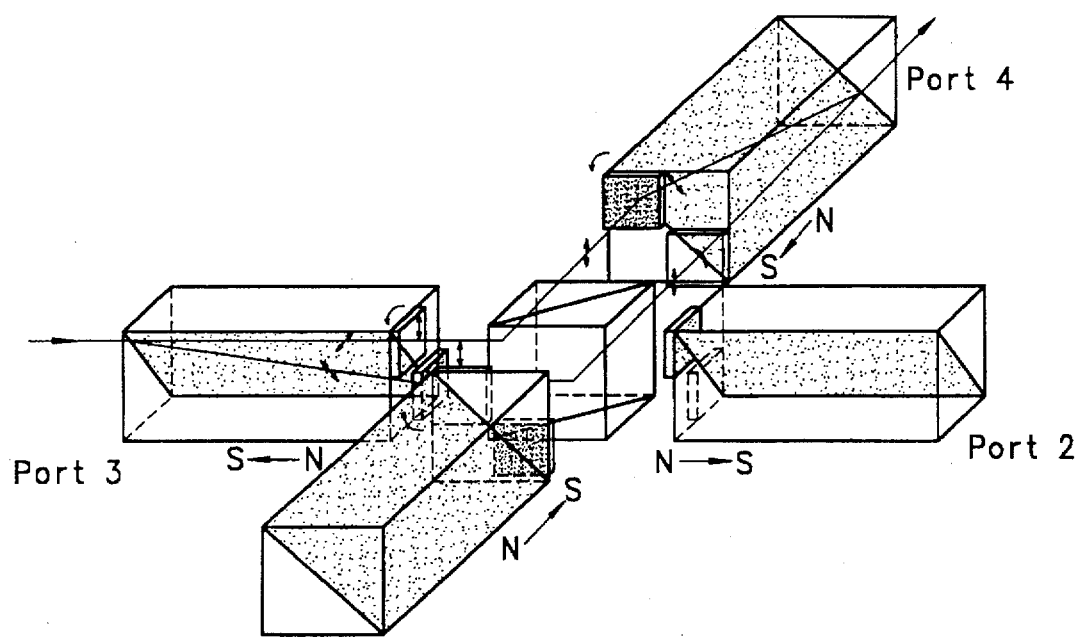
FIG. 6C illustrates light transmission from the third port to the fourth port of the FIG. 6A circulator.
Figure 6D:
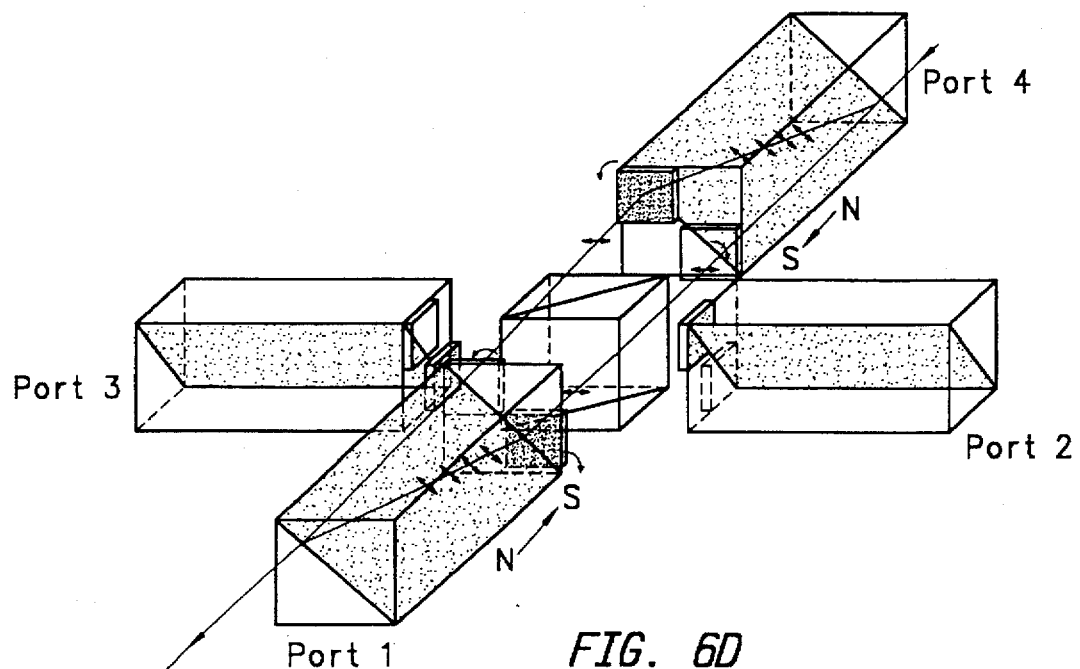
FIG. 6D illustrates light transmission from the fourth port to the first port of the FIG. 6A circulator.

FIG. 6A illustrates the transmission of a light signal from the first port to the second port; FIG. 6B illustrates the transmission of a light signal from the second port to the third port; FIG. 6C illustrates the transmission of a light signal from the third port to the fourth port; and FIG. 6D illustrates the transmission of a light signal from the fourth port back to the first port. The polarization sensitive circulator at the center of the port assemblies is a conventional PBS cube, rather than the PBS illustrated in FIG. 5.

Figure 7A:
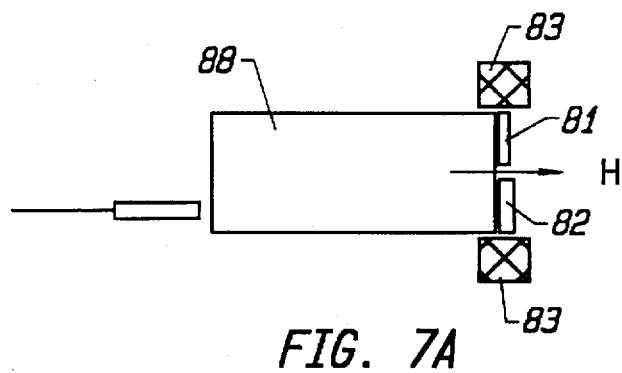
FIG. 7A is a diagram showing an optical port assembly with the different Faraday rotators.
Figure 7B:
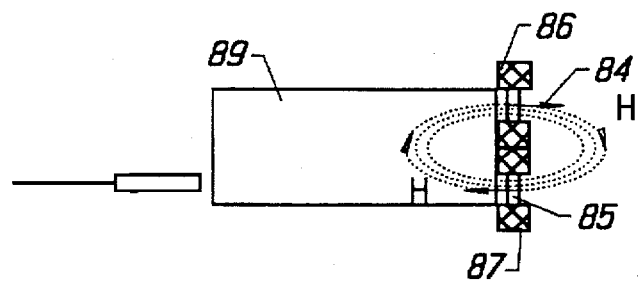
FIG. 7B is a diagram showing an optical port assembly with the identical Faraday rotators.

FIGS. 7A and 7B illustrate alternative arrangements of the Faraday rotators in an optical port assembly. Certain materials act as polarization rotators when placed in a static magnetic field, a property known as the Faraday effect. The angle of rotation for linear polarization, q, is proportional to the thickness of material, d, and the component H of the magnetic flux density in the direction of wave propagation, i.e.:

$$q = VdH$$

where V is the Verdet constant which varies with wavelength. Different rotator materials have different Verdet constants, and with different signs. For example, one material is single-crystal $Y_3Fe_5O_{12}$ (YIG) and another is a thick film of $GdB_{3-x}Bi_xFe_5O_{12}$ (GBIG). Their Verdet constants have opposite signs.

With different materials with Verdet constants of opposite signs, the two states of linear polarization associated with the two beams created by the birefringent crystal rod in an optical port assembly can be rotated into the same polarization with the same magnet. This arrangement is illustrated in FIG. 7A, where two rotators 81 and 82 of different Faraday effect materials are employed with one magnet 83 before a birefringent crystal rod 88. If two identical Faraday rotators (with the same Verdet constants, of course) are used, the two states of polarization of the two beams can be rotated into the same polarization by two magnets having magnetic fields in the opposite directions. FIG. 7B illustrates a port assembly arrangement where two rotators 84 and 85 of the same Faraday effect material are used. One of two magnets 86 and 87 with different directions are employed around each Faraday rotator. The magnetic fields of the two magnets create a circle of one magnetic field, H, as shown in the figure. In either case, with the results of two beams having the same linear polarization, a simple polarization sensitive circulator, a PBS as described above, can be used to direct the propagation of beams.

A circulator according to the present invention has low polarization mode dispersion (PMD). PMD is measured in terms of a time delay between two light beams travelling between two points along different paths. For the optical port assembly having different Faraday rotators, PMD is automatically introduced. Faraday effect materials with different Verdet constants have different values of refractive indices and the thicknesses of the two rotators are different. Once the magnetic field is set and the Verdet constant determined by the selection of the Faraday material, the thickness d of the material is set to obtain a rotation of 45°. Thus, the optical paths through the Faraday rotators (defined as the product of the rotator thickness and its refractive index) are different. After light passes through the two Faraday rotators at an input port assembly, a time delay is created between two beams. This delay is compensated for at the output port. One beam which passes through the first type of Faraday rotator at the input port passes through the second kind of Faraday rotator at the output port, while the other beam which passes through the second type of Faraday rotator at the input port passes through the first type of Faraday rotator at the output port. With this arrangement, the time delay is cancelled so that PMD is avoided.

When the same Faraday rotators are employed in the optical port assemblies, this problem is avoided entirely.

Another source of PMD is the birefringent crystal rod in each of the optical port assemblies. Each beam which is split by the birefringent rod travels a different distance in the rod with a different index of refraction. The time delay created at an input port assembly is compensated for at the output port assembly. The e-beam at the input port assembly becomes the o-beam at the output port assembly, while the o-beam at the input port assembly becomes the e-beam at the output port assembly. With the same length and material of two birefringent crystal rods, this dispersion is also averted.

To optimize the performance of the circulator, all surfaces through which light is propagated are anti-reflection (AR) coated. One note should be made for the PBS prism side surface 55 (FIG. 5) where light of one polarization is transmitted (refracted) and light of another polarization is totally internally reflected in PBS prism. The AR coating on that surface should be formulated for the transmitted light beam. With such a coating, the light beam reflected is transmitted into the coating layer but will be still totally internally reflected at the outermost surface of the coating layers. Generally, any equal-thickness coating on totally internal reflections does not change this property.

With the described optical circulator, the isolation and cross-talk performance have been found to reach −60 dB, PMD reduced to the order of a femtosecond, PDL less than 0.1 dB, while the insertion loss is reduced to around 1 dB. Moreover, the power handling capability of the circulator is increased to 300 mW. From the manufacturing standpoint, the optical circulator is modularized into assemblies and subassemblies for ease of construction.

Of course, the described circulator is a four-port circulator. A three-port circulator can be easily created with the elimination of the fourth optical port assembly. With the elimination of the third optical port assembly, the remaining device is an optical isolator.

Figure 8:
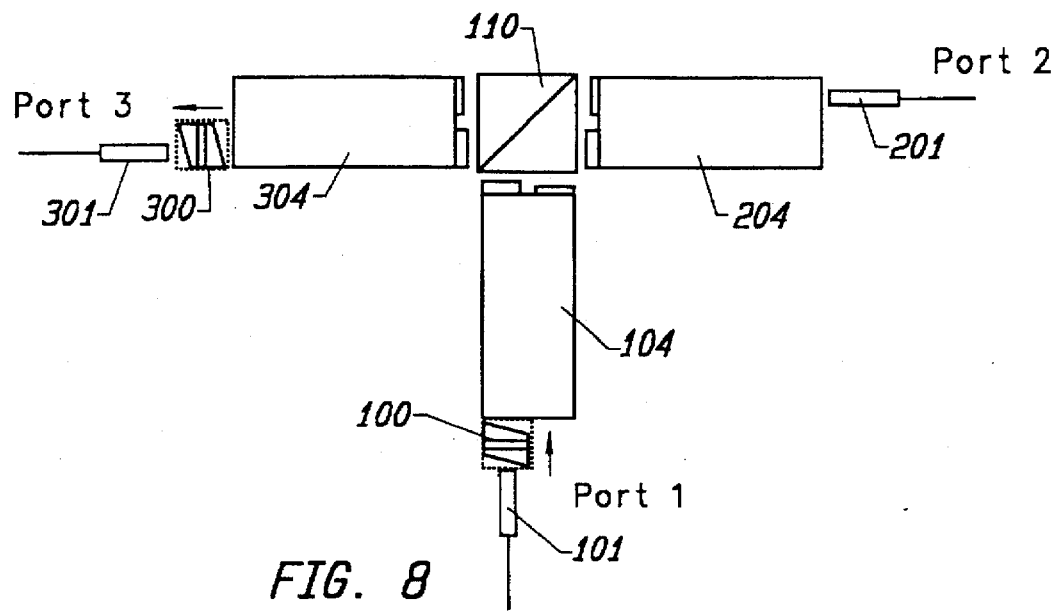
FIG. 8 is a diagram showing isolator assemblies employed in the circulator to improve the isolation of circulator.

The isolation performance of a three-port circulator can also be improved with the insertion of isolator core subassemblies into the circulator. An isolator core subassembly 100 is formed by the two birefringent crystal wedges which are separated by a Faraday rotator and is described in the previously cited U.S. Pat. No. 5,208,876. The birefringent wedges are the polarizer and the analyzer of an optical isolator. FIG. 8 illustrates the placement of an isolator core subassembly 100 between a collimator subassembly 101 and birefringent crystal rod 104 of the first optical port assembly. Another isolator core subassembly 300 is employed between a collimator subassembly 301 and birefringent crystal rod 304 of the third optical port assembly. Of course, the isolator core subassemblies are arranged in the direction of optical circulation. If only one pair of ports requires the improved isolation (from port 1 to port 2, or from port 2 to port 3), only one isolator core subassembly is necessary.

Finally, it should be noticed that each of the Faraday rotators and magnets of an optical port assembly occupies a certain amount of space. If an unpolarized beam is not sufficiently separated physically into its polarized component beams by the time the beams leave the birefringent rod, the beams cannot pass through their respective Faraday rotators. Of course, the birefringent rod could be elongated to ensure sufficient physical separation of the beam. But this increases the size of each optical port assembly and the overall size of the circulator.

Figure 9A:
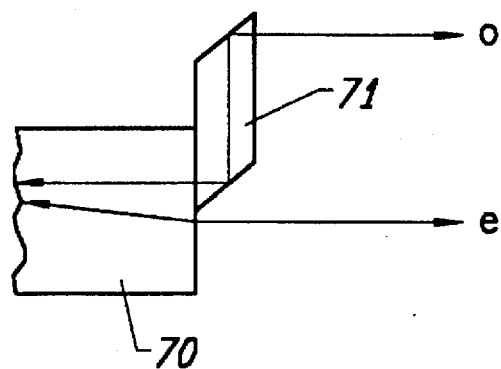
FIG. 9A is a top view diagram of a partial optical port assembly of FIG. 3 which illustrates a prism which can be inserted between the birefringent crystal rod and a Faraday rotator to separate the o- and e-beams.
Figure 9B:
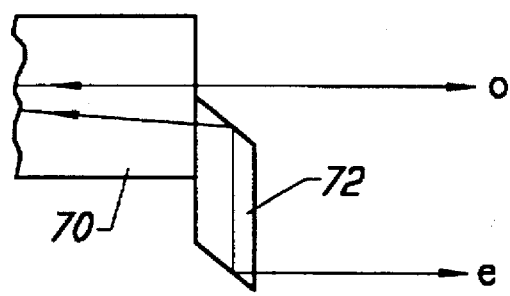
FIG. 9B illustrates another arrangement for a prism to be inserted between the birefringent crystal rod and a Faraday rotator to separate the o- and e-beams.
Figure 9C:
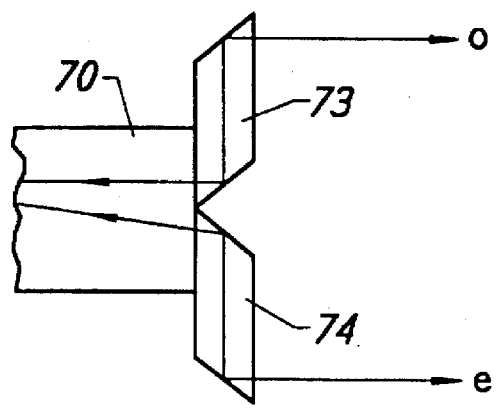
FIG. 9C illustrates an arrangement in which two prisms are inserted between the birefringent crystal rod and the Faraday rotators in an optical port assembly to separate the o- and e-beams.

With the insertion of glass prisms between the end of a birefringent rod and Faraday rotators, the separation between the polarized beam components can be easily increased without increasing the length of the birefringent rod in an optical port assembly. The prisms form parallelograms in the top views of FIGS. 9A–9C. In FIG. 9A a prism 71 is attached to the end face of a birefringent rod 70 in the path of the o-beam component. Upon entering the prism 71 in a forward direction (from the birefringent rod 70), the o-beam is further separated from, and emerges from the prism 71 parallel to, the e-beam. The prism also works in a reverse direction. In FIG. 9B a prism 72 is similarly attached to the end face of a birefringent rod 70 in the path of the e-beam component. Finally, in FIG. 9C two prisms 73 and 74 are attached in the paths of both the o- and e-beams. This arrangement is most suitable for keeping PMD low since both beam components travel substantially the same distance in closely dimensioned prisms 73 and 74.

While the above is a complete description of the preferred embodiments of the present invention, various alternatives, modifications and equivalents may be used. It should be evident that the present invention is equally applicable by making appropriate modifications to the embodiment described above. Therefore, the above description should not be taken as limiting the scope of invention which is defined by the metes and bounds of the appended claims.

What is claimed is:

1. An optical circulator comprising:
    a polarization beam splitter comprising first and second prisms forming an interface therebetween, said interface transmitting linearly polarized light directed at said interface in directions responsive to a polarization orientation of linearly polarized light;
    first, second and third optical port assemblies, each optical port assembly further comprising:
        an end of an optical fiber;
        means for collimating light from said optical fiber end into a beam of collimated light and for focussing a beam of collimated light to said optical fiber end in a reverse direction;
        a birefringent crystal dimensioned and arranged with respect to said collimating and focussing means to split said collimated light beam from said collimating and focussing means into two parallel beams of light linearly polarized perpendicularly to each other, and to combine parallel beams of light linearly polarized perpendicularly to each other into reverse direction into a beam of collimated light toward said collimating and focussing means; and
        first and second Faraday rotators arranged with respect to said birefringent crystal to rotate said parallel beams from said birefringent crystal by equal and opposite angles so that said rotated beams are linearly polarized parallel to each other and to rotate parallel beams in said reverse direction by equal and opposite angles so that said rotated beams are linearly polarized perpendicularly to each other;
    said optical port assemblies arranged with respect to said polarization beam splitter so that light from said first port assembly is transmitted by said beam splitter interface to said second optical port assembly and light from said second optical port assembly is transmitted by said beam splitter interface to said third optical port assembly.

2. The optical circulator of claim 1 wherein said first and second optical port assemblies are substantially aligned opposite each other with said polarization beam splitter between, said first optical port assembly directing light linearly polarized in a plane of incidence against said interface.

3. The optical circulator of claim 1 wherein said first and second optical port assemblies are aligned adjacent to each other about said polarization beam splitter, said first optical port assembly directing light linearly polarized perpendicular to a plane of incidence against said interface.

4. The optical circulator of claim 1 further comprising a fourth optical port assembly, said fourth optical port assembly arranged with respect to said polarization beam splitter so that light from said third port assembly is transmitted by said beam splitter interface to said fourth optical port assembly.

5. The optical circulator of claim 1 wherein said polarization beam splitter comprises:
    a first birefringent crystal prism having first, second and third faces, said collimated light substantially normal to said first face, said collimated light incident upon said second face at an angle $\phi$ with respect to a line normal to said second face so that light polarized perpendicular to a plane of incidence upon said second face is reflected toward said third face, said third face normal to said reflected light, and light polarized in said plane of incidence is refracted at said second face; and
    a second birefringent crystal prism having a second face parallel to, and in close proximity with, said second face of said first birefringent prism so that light refracted at said second face of said first prism is refracted at said second face of said second prism and into said second prism, and a first face positioned with respect to said second face so that light refracted into said second prism is refracted at said first face from said second prism cross-sectionally undistorted with respect to a cross-section of said light polarized in said plane of incidence at said second face of said first prism.

6. The optical circulator of claim 5 wherein said light polarized perpendicular to a plane of incidence upon said second face of said first prism travels through said first prism according to a first index of refraction $n_1$, and light polarized in said plane of incidence at said second face of said first prism travels through said first prism according to a second index of refraction $n_2$, $n_1$ greater than $n_2$.

7. The optical circulator of claim 6 wherein the following conditions are simultaneously satisfied in said first prism:
    $n_2 \sin(\phi) = \sin(\Phi_2) < 1$ and
    $n_1 \sin(\phi) > 1$
where $\Phi_2$ is an angle $\phi$ with respect to a line normal to said second face at which light polarized in said plane of incidence is refracted at said second face.

8. The optical circulator of claim 7 wherein said first prism has an optical axis perpendicular to said plane of incidence.

9. The optical circulator of claim 7 wherein light polarized perpendicularly to a plane of incidence upon said second face of said first prism comprises an ordinary beam in said first prism and light polarized in said plane of incidence upon said second face of said first prism comprises an extraordinary beam in said first prism.

10. The optical circulator of claim 7 wherein light polarized perpendicularly to a plane of incidence upon said second face of said first prism comprises an extraordinary beam in said first prism and light polarized in said plane of incidence upon said second face of said first prism comprises an ordinary beam in said first prism.

11. The optical circulator of claim 5 wherein said first prism comprises $LiNbO_3$, said first and third faces forming an angle of 125° with respect to each other, and said first and third faces each forming an angle of 27.5° with respect to said second face.

12. The optical circulator of claim 1 wherein each prism of said polarization beam splitter comprises glass and has a hypotenuse face, and first and second faces forming a right angle with each other, said hypotenuse face forming an interface with the other hypotenuse face of the other prism, said first optical port assembly aligned substantially perpendicularly to a first face of said first prism, said second optical assembly aligned substantially perpendicularly to a second face of said first prism, and said third optical assembly aligned substantially perpendicularly to a first face of said second prism.

13. The optical circulator of claim 1 wherein said first and second Faraday rotators have opposite Verdet constant signs.

14. The optical circulator of claim 13 further comprising a magnet positioned in close proximity with said first and second Faraday rotators, said magnet generating a magnetic field encompassing said first and second Faraday rotators.

15. The optical circulator of claim 1 further comprising first and second magnets positioned in close proximity with said first and second Faraday rotators respectively, said first magnet generating a first magnetic field in a first direction encompassing said first Faraday rotator, said second magnet generating a second magnetic field opposite to said first direction encompassing said second Faraday rotator, said first and second Faraday rotators comprising the same material.

16. The optical circulator of claim 1 further comprising a first prism arranged between said birefringent crystal and one of said first and second Faraday rotators, said first prism receiving one of said parallel beams of light linearly polarized perpendicular to each other from said birefringent crystal and separating said one parallel beam from the other.

17. The optical circulator of claim 16 further comprising a second prism arranged between said birefringent crystal and the other of said first and second Faraday rotators, said second prism receiving the other of said parallel beams of light linearly polarized perpendicular to each other from said birefringent crystal and separating said other parallel beam from said one parallel beam.

* * * * *